United States Patent [19]

Ho et al.

[11] Patent Number: 4,509,817

[45] Date of Patent: Apr. 9, 1985

[54] METHOD FOR CORRECTING VOLUME-PHASE-GELATIN HOLOGRAMS BRAGG'S ANGLE DEVIATION

[75] Inventors: Ping-Pei Ho, New Caanan, Conn.; Brian A. Gorin, Lakegrove, N.Y.; Nayana S. Bora, Colorado Springs, Colo.

[73] Assignee: NCR Corporation, Dayton, Ohio

[21] Appl. No.: 519,465

[22] Filed: Aug. 1, 1983

[51] Int. Cl.³ .............................................. G03H 1/02
[52] U.S. Cl. ...................................... 350/3.61; 430/2
[58] Field of Search ................. 350/3.6, 3.61; 430/1, 430/2, 350, 354

[56] References Cited

U.S. PATENT DOCUMENTS

| | | | |
|---|---|---|---|
| 3,660,091 | 5/1972 | Shanhoff et al. | 350/3.61 |
| 3,695,879 | 10/1972 | Laming et al. | 350/3.61 |
| 3,925,077 | 12/1975 | Lewis et al. | 430/2 |
| 4,422,713 | 12/1983 | Grant et al. | 350/3.61 |

Primary Examiner—John K. Corbin
Assistant Examiner—William Propp
Attorney, Agent, or Firm—J. T. Cavender; Wilbert Hawk, Jr.; Richard W. Lavin

[57] ABSTRACT

The Bragg's angle deviation of volume-phase-gelatin holograms is corrected by increasing the water content of the developed hologram and then reducing the water content of the hologram until the Bragg's angle deviation is zero.

7 Claims, 1 Drawing Figure

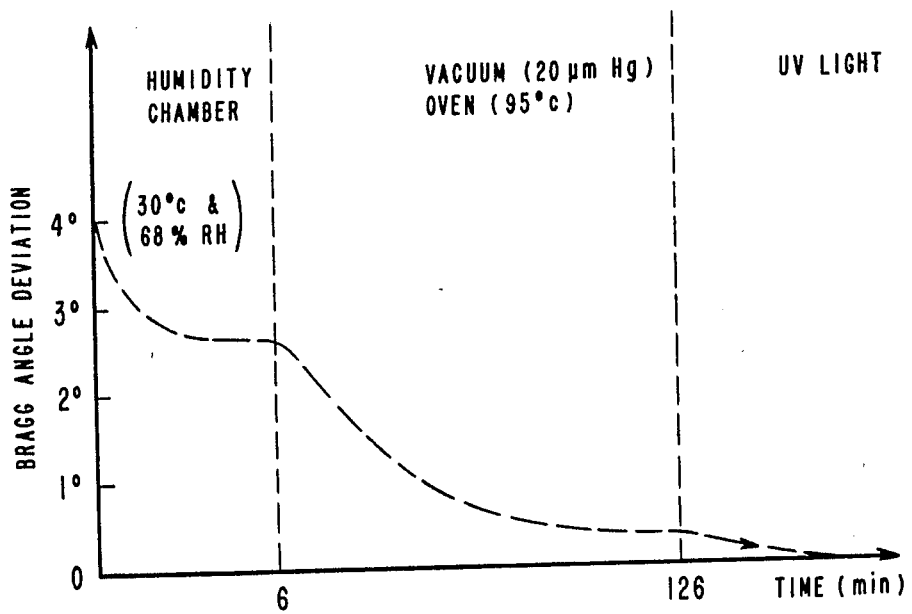

4,509,817

METHOD FOR CORRECTING VOLUME-PHASE-GELATIN HOLOGRAMS BRAGG'S ANGLE DEVIATION

BACKGROUND OF THE INVENTION

This invention relates to phase holograms and more particularly to the post-processing of dichromated gelatin holograms for correcting the Bragg angle deviation of the hologram.

An important factor in the determination of the relative merits of holograms is diffraction efficiency. With respect to the observation of a reconstructed image from holograms with the naked eye, a higher diffraction efficiency indicates that the laser output may be smaller for a predetermined level of brightness or that a brighter reconstructed image can be observed for a predetermined level of laser output intensity. A high diffraction efficiency of the hologram, however, has much greater significance, where holograms are used in optical scanning devices. More specifically, in a holographic scanner where a hologram is illuminated by a laser light beam to project the diffracted light beam along a scanning path, the laser must be compact in size, low in power consumption, long on life and inexpensive to manufacture. Therefore the intensity of the diffracted light for scanning an object must be higher to avoid the introduction of nonuniformity and low-output power for the scanning laser beam. Where silver-halide-gelatin holograms and dichromated-gelatin holograms are utilized in such scanning systems, the Bragg's angle deviation in such holograms is required to be corrected to zero with minimum diffraction efficiency lost during the treatmént. The reconstruction angle of a hologram is one of the most important designa parameters in holographic scanners. The thickness of a volume phase gelatin hologram processed through a fast alcohol dehydration technique is normally increased. Because of this increased thickness, the reconstruction angle of volume phase holograms has a different value compared to the original construction angle. This has the effect of distorting the output laser beam thereby producing a very low efficency scanning system. This gelatin swelling property is the result of an incomplete orientational adsorption of water molecules to gelatin molecules in the fast dehydration process which is not stable in the presence of a water vapor environment. Prior art treatment for this type of hologram includes baking and vacuum processes to reduce the water content of the hologram. It has been found that this approach could not guarantee a complete correction of the Bragg's angle deviation. It is therefore a principal object of the invention to provide a method for post-processing a volume phase gelatin hologram for correcting the Bragg's angle deviation to a zero angle condition. It is another object of this invention to provide a method for post-processing a volume phase gelatin hologram for increasing the diffraction efficiency of the hologram. It is another object of this invention to produce a volume phase gelatin hologram that has a high diffraction efficiency and a high index of refraction modulation.

SUMMARY OF THE INVENTION

These and other objects of the invention are fulfilled by exposing a developed hologram to a controlled humidity environment for a first time period, placing the humidity-treated hologram in a temperature elevated and pressure reduced vacuum oven, illuminating the post-treated hologram with an ultraviolet light, monitoring the Bragg's angle deviation of the illuminated hologram during this illumination until it is completely corrected and cementing a glass cover plate to the treated hologram.

BRIEF DESCRIPTION OF THE DRAWING

In the drawing, the single FIGURE is a graphical representation of the process for correcting the Bragg's angle deviation on coordinates of Bragg's angle deviation against processing time.

DESCRIPTION OF THE PREFERRED EMBODIMENT

In the production of volume phase gelatin holograms, silver halide photographic material, as an example, is exposed in a holographic optical system, developed and fixed after which it is treated with a bleach which converts the silver metal in the exposed area of the material to a silver salt. The by-products of the bleaching step result in an image-wise cross linking of adjacent gelatin molecules which provides a pure phase structure. The silver salt is subsequently removed after which a re-swelling and dehydration process occurs resulting in an increase in the thickness of the emulsion. The primary difficulty with this type of process is that the thickness of the emulsion is changed as a result of the above cited step thereby affecting the reconstruction angle of the hologram. Since the readout angle to the holographic scanning disc in the holographic scanner is required to be equal to the contruction angle, the deviation of the hologram's Bragg condition in the hologram forming process severely reduces the diffraction efficiency thereby introducing nonuniformity and a low-output power for the output scanning laser beam. In order to maintain high diffraction efficiency and uniform diffractive scanning beam, the hologram's Bragg's angle deviation has to be corrected with minimum diffraction efficiency lost during the treatment. We have found that placing the hologram in a controlled humidity chamber where the high concentration of water vapor enhances the gelatin bond strength thereby reducing the total thickness of the emulsion. The humidity-treated hologram is then placed in a temperature elevated and vapor pressure reduced vacuum oven where some excess water can be removed and the gelatin hardness is increased. The hologram is then exposed to an ultraviolet light during which the Bragg's angle deviation is continuously monitored until it reaches zero. A glass cover plate is then cemented to the treated hologram to avoid any change in the moisture content of the hologram.

This process is illustrated in the FIGURE of the drawing where a silver-halide-gelatin hologram developd from a Kodak 649F photographic plate is placed in a humidity chamber having a temperature of 30 degrees centrigrade at a relative humidity of 68%. Since the increase in thickness of the hologram is mainly attributed to the incomplete orientational adsorption of water molecules to gelatin molecules during the hologram's fast dehydration developing process, the developed hologram is subjected to a controlled water vapor environment which will reduce the volume of bonded molecules. In this step, the total weight of the hologram may be increased with a corresponding decrease in thickness. The humidity-treated hologram is then inserted into a vacuum oven which is set at 95 degrees centigrade at a pressure of 20 microns of Hg for a period of 2 hours after which the treated hologram was exposed to a 90 candle or candela mercury spectral lamp positioned 10 cm away. During the time that the hologram is exposed to the ultraviolet light, the Bragg's angle deviation is continuously monitored until it is equal to zero. Since gelatin holograms are susceptible to a humid environment, a glass plate was cemented to the gelatin side of the hologram. A commercially available optical adhesive such as NOA-61, a product of Norland Products, Inc. of New Brunswick, N.J. is used in cementing a glass-cover plate to the hologram. Without interacting with the gelatin hologram, it has been found that this adhesive can be cured by an ultraviolet light illumination in 24 hours with about 97% transmission at a wavelength of 633 nm light. It is important to insure that the hologram is dry when cementing the cover plate to the hologram especially after the post-humidity process. This cementing of the cover should take place within 5 min. after the holorgam has been processed.

The resulting phase hologram contains a permanent finished pattern which was characterized by high diffraction efficiency, high resolution and a reconstruction angle deviation of zero degrees. For example, by starting with a silver halide gelatin hologram of mean diffraction efficiency of 62% at Bragg's condition which is about 4 degrees off the construction angle, we can expect about 50% absolute mean diffraction efficiency after processing of the original construction angle.

While the present invention has been described in detail with reference to a specific embodiment thereof, it is to be understood that various modifications and alterations may be resorted to without departing from the spirit and scope of the invention. For example, this process may be utilized in correcting refractive index over-modulation. In such a condition, the reduction of matrix modulation can increase diffraction efficiency wile the emulsion thickness problem cited above is also corrected. The type of phase hologram that can be used with the process is dichromated gelatin holograms. The invention, therefore, was not intended to be limited by the illustrated examples, but only by the appended claims.

What is claimed is:

1. A process for the production of a phase hologram, comprising steps of:
    exposing a developed phase hologram to a high concentration of water vapor;
    drying the hologram at an elevated temperature and in a vapor pressure reduced vacuum;
    and exposing the dried hologram to an ultraviolet light for reducing the thickness of the hologram.

2. The process of claim 1 in which the step of drying further include the step of monitoring the Bragg's angle deviation until it has reached zero degrees.

3. The process of claim 2 which further includes the step of cementing a glass cover plate to the treated hologram following exposure to the ultraviolet light.

4. The process of claim 3 in which the developed phase hologram is exposed to a water vapor having a relative humidity of 68 percent and at a temperature of 30 degrees centigrade for a time period of 6 minutes.

5. The process of claim 4 in which the developed phase hologram is dried in a vacuum 20 um of Hg at a temperature of 95 degrees centrigrade for a time period of 120 minutes.

6. A process for the production of a phase hologram, comprising the steps of:
    exposing dichromated gelatin material in the exposure plane of a holographic optical system;
    developing the exposed recording material with a water, alcohol process;
    exposing the developed phase hologram to a high concentration of water vapor;
    drying the hologram in a temperature elevated and vapor pressure reduced vacuum;
    and exposing the dried hologram to an ultraviolet light for reducing the thickness of the hologram.

7. The process of claim 6 in which the step of drying further includes the step of monitoring the Bragg's angle deviation until it has reached zero degrees.

* * * * *